US011539410B2

(12) United States Patent
Gopal et al.

(10) Patent No.: US 11,539,410 B2
(45) Date of Patent: Dec. 27, 2022

(54) ANTENNA SWITCHING FOR A MULTIPLE SUBSCRIBER IDENTITY MODULE USER EQUIPMENT

(71) Applicant: QUALCOMM Incorporated, San Diego, CA (US)

(72) Inventors: Thawatt Gopal, San Diego, CA (US); Sridhar Bandaru, Westminster, CO (US); Qingxin Chen, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/445,413

(22) Filed: Aug. 19, 2021

(65) Prior Publication Data

US 2022/0311485 A1  Sep. 29, 2022

Related U.S. Application Data

(60) Provisional application No. 63/166,840, filed on Mar. 26, 2021.

(51) Int. Cl.
*H04B 1/04* (2006.01)
*H04B 7/06* (2006.01)
*H04W 8/18* (2009.01)
*H04W 88/02* (2009.01)

(52) U.S. Cl.
CPC .......... *H04B 7/0602* (2013.01); *H04W 8/183* (2013.01); *H04W 88/02* (2013.01)

(58) Field of Classification Search
CPC .......... H04B 7/02; H04B 7/04; H04B 7/0602; H04B 7/0613; H04B 7/0404; H04B 7/0802; H04W 88/02; H04W 8/183
See application file for complete search history.

(56) References Cited

U.S. PATENT DOCUMENTS

| 9,306,653 | B2 * | 4/2016 | Sun ...................... H04B 7/0871 |
| 9,521,563 | B2 * | 12/2016 | Su ............................ H04L 69/18 |
| 10,291,310 | B1 | 5/2019 | Gopal et al. |
| 10,367,537 | B2 * | 7/2019 | Jeong .................... H04W 76/16 |

(Continued)

OTHER PUBLICATIONS

International Search Report and Written Opinion—PCT/US2022/070398—ISA/EPO—dated May 30, 2022.

*Primary Examiner* — Nhan T Le
(74) *Attorney, Agent, or Firm* — Qualcomm Incorporated

(57) ABSTRACT

Various aspects of the present disclosure generally relate to wireless communication. In some aspects, a user equipment (UE) may transmit, on a first subscriber identity module (SIM) operating in a connected mode, a signal using a first antenna associated with a first antenna module. The UE may configure, for a second SIM operating in an idle mode, a second antenna associated with the first antenna module for receive operations. The UE may switch a transmit antenna associated with the first SIM from the first antenna to a third antenna associated with a second antenna module based at least in part on configuring the second antenna for receive operations and based at least in part on the first antenna module being unable to support concurrent transmission and reception of signals. The UE may transmit, on the first SIM, a signal using the third antenna. Numerous other aspects are described.

30 Claims, 11 Drawing Sheets

(56) References Cited

U.S. PATENT DOCUMENTS

2016/0316378 A1   10/2016  Su et al.
2018/0368098 A1   12/2018  Gopal et al.
2021/0112399 A1*  4/2021  Gopal .................. H04W 8/183

* cited by examiner

# ANTENNA SWITCHING FOR A MULTIPLE SUBSCRIBER IDENTITY MODULE USER EQUIPMENT

CROSS-REFERENCE TO RELATED APPLICATION

This patent application claims priority to U.S. Provisional Patent Application No. 63/166,840, filed on Mar. 26, 2021, entitled "ANTENNA SWITCHING FOR A MULTIPLE SUBSCRIBER IDENTITY MODULE USER EQUIPMENT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for antenna switching for a multiple subscriber identity module (SIM) user equipment (UE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: transmit, on a first subscriber identity module (SIM) operating in a connected mode, a signal using a first antenna associated with a first antenna module of the UE; configure, for a second SIM operating in an idle mode, a second antenna associated with the first antenna module for receive operations associated with an active time of the idle mode; switch a transmit antenna associated with the first SIM from the first antenna to a third antenna associated with a second antenna module based at least in part on configuring the second antenna for receive operations associated with the active time and based at least in part on the first antenna module being unable to support concurrent transmission and reception of signals; and transmit, on the first SIM, a signal using the third antenna.

In some aspects, a method of wireless communication performed by a UE includes transmitting, on a first SIM operating in a connected mode, a signal using a first antenna associated with a first antenna module of the UE; configuring, for a second SIM operating in an idle mode, a second antenna associated with the first antenna module for receive operations associated with an active time of the idle mode; switching a transmit antenna associated with the first SIM from the first antenna to a third antenna associated with a second antenna module based at least in part on configuring the second antenna for receive operations associated with the active time and based at least in part on the first antenna module being unable to support concurrent transmission and reception of signals; and transmitting, on the first SIM, a signal using the third antenna.

In some aspects, a non-transitory computer-readable medium storing a set of instructions for wireless communication includes one or more instructions that, when executed by one or more processors of a UE, cause the UE to: transmit, on a first SIM operating in a connected mode, a signal using a first antenna associated with a first antenna module of the UE; configure, for a second SIM operating in an idle mode, a second antenna associated with the first antenna module for receive operations associated with an active time of the idle mode; switch a transmit antenna associated with the first SIM from the first antenna to a third antenna associated with a second antenna module based at least in part on configuring the second antenna for receive operations associated with the active time and based at least in part on the first antenna module being unable to support concurrent transmission and reception of signals; and transmit, on the first SIM, a signal using the third antenna.

In some aspects, an apparatus for wireless communication includes means for transmitting, on a first SIM operating in a connected mode, a signal using a first antenna associated with a first antenna module of the apparatus; means for configuring, for a second SIM operating in an idle mode, a second antenna associated with the first antenna module for receive operations associated with an active time of the idle mode; means for switching a transmit antenna associated with the first SIM from the first antenna to a third antenna associated with a second antenna module based at least in part on configuring the second antenna for receive operations associated with the active time and based at least in part on the first antenna module being unable to support concurrent transmission and reception of signals; and means for transmitting, on the first SIM, a signal using the third antenna.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
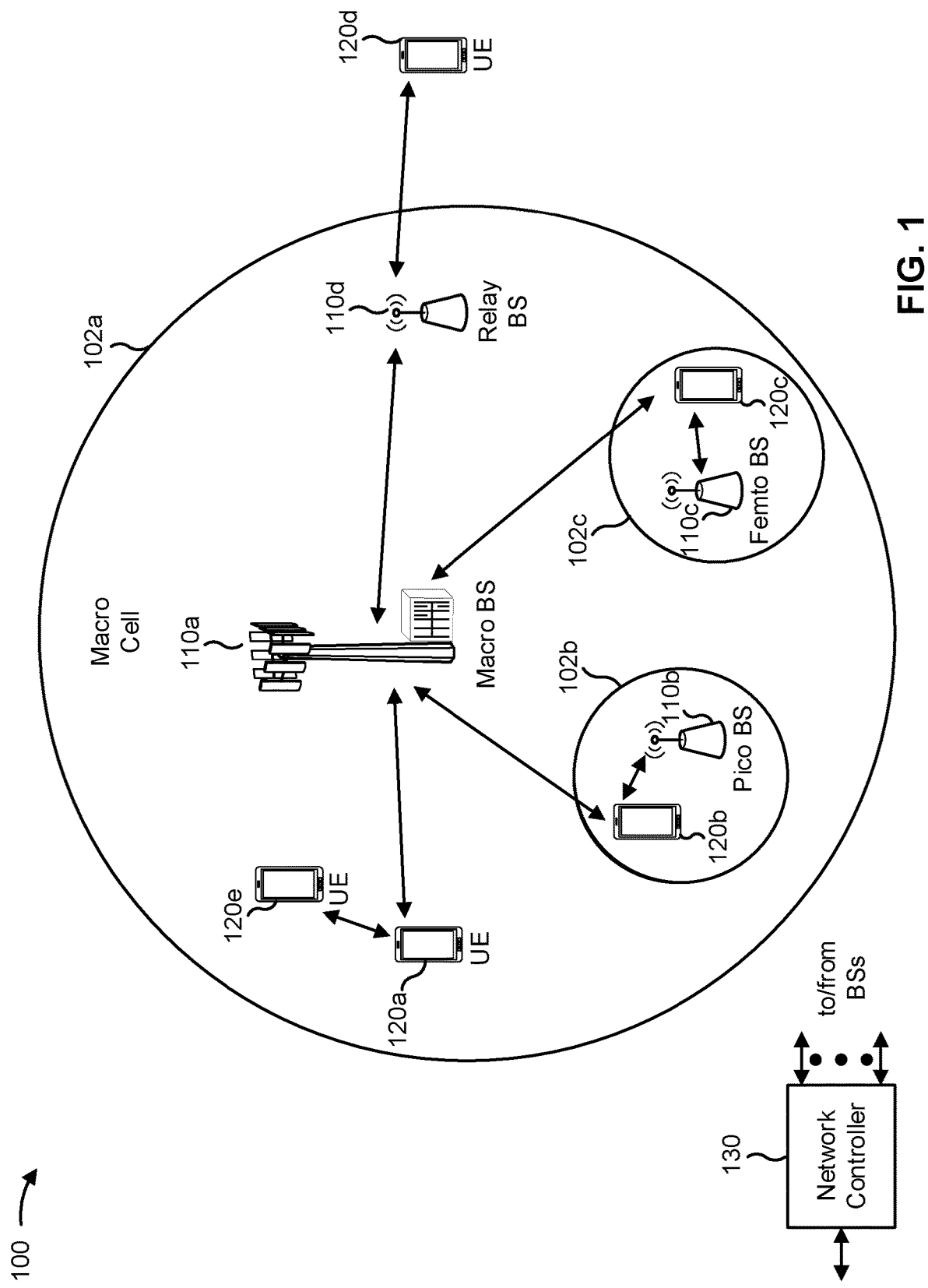
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
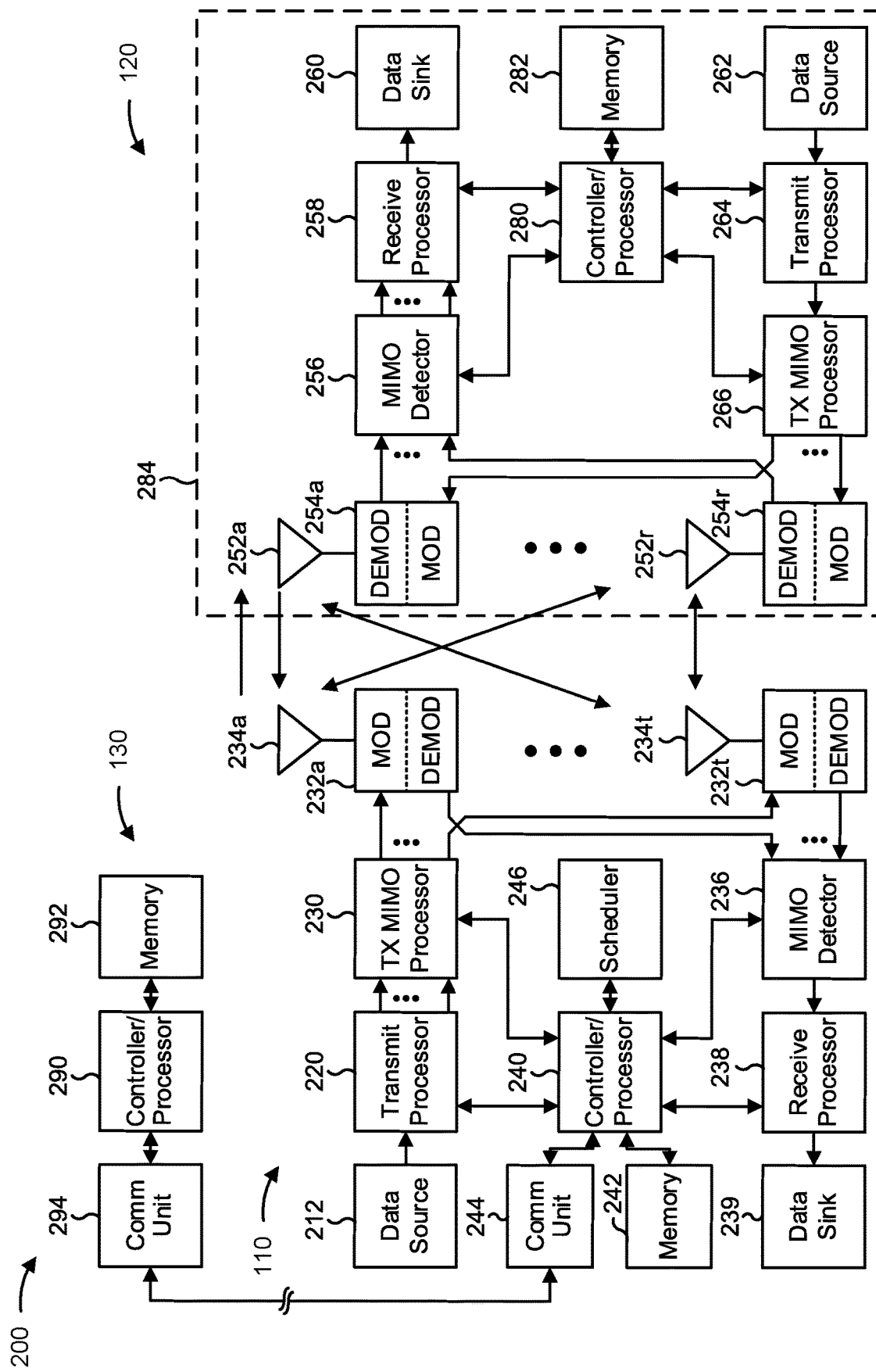
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6, 7A, 7B, 7C, 8 and 9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6, 7A, 7B, 7C, 8 and 9).

Controller/processor 240 of base station 110, controller/processor 280 of UE 120, and/or any other component(s) of FIG. 2 may perform one or more techniques associated with antenna switching for a multiple subscriber identity module (SIM) UE, as described in more detail elsewhere herein. For example, controller/processor 240 of base station 110, controller/processor 280 of UE 120, and/or any other component(s) of FIG. 2 may perform or direct operations of, for example, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some aspects, executing instructions may include running the instructions, converting the instructions, compiling the instructions, and/or interpreting the instructions, among other examples.

In some aspects, the UE 120 includes means for transmitting, on a first SIM operating in a connected mode, a signal using a first antenna associated with a first antenna module of the UE; means for configuring, for a second SIM operating in an idle mode, a second antenna associated with the first antenna module for receive operations associated with an active time of the idle mode; means for switching a transmit antenna associated with the first SIM from the first antenna to a third antenna associated with a second antenna module based at least in part on configuring the second antenna for receive operations associated with the active time and based at least in part on the first antenna module being unable to support concurrent transmission and reception of signals; and/or means for transmitting, on the first SIM, a signal using the third antenna. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
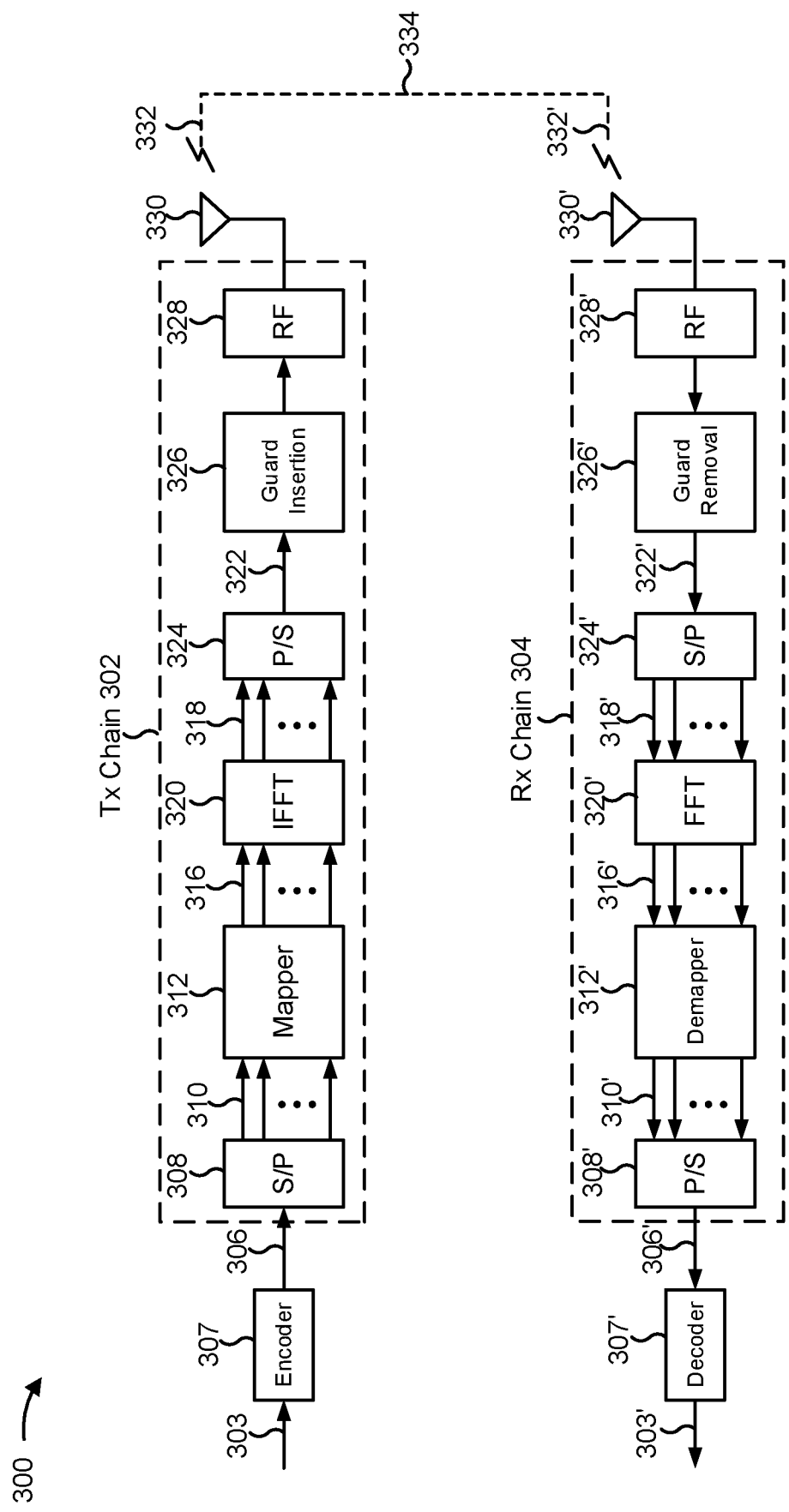
FIG. 3 is a diagram illustrating an example of a transmit (Tx) chain and a receive (Rx) chain of a UE, in accordance with the present disclosure.

FIG. 3 is a diagram illustrating an example 300 of a transmit (Tx) chain 302 and a receive (Rx) chain 304 of a UE, in accordance with the present disclosure. In some aspects, one or more components of Tx chain 302 may be implemented in transmit processor 264, TX MIMO processor 266, MOD/DEMOD 254, and/or controller/processor 280, as described above in connection with FIG. 2. In some aspects, Tx chain 302 may be implemented in UE 120 for transmitting data 306 (e.g., uplink data, an uplink reference signal, and/or uplink control information) to base station 110 on an uplink channel.

An encoder 307 may alter a signal (e.g., a bitstream) 303 into data 306. Data 306 to be transmitted is provided from encoder 307 as input to a serial-to-parallel (S/P) converter 308. In some aspects, S/P converter 308 may split the transmission data into N parallel data streams 310.

The N parallel data streams 310 may then be provided as input to a mapper 312. Mapper 312 may map the N parallel data streams 310 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 312 may output N parallel symbol streams 316, each symbol stream 316 corresponding to one of N orthogonal subcarriers of an inverse fast Fourier transform (IFFT) component 320. These N parallel symbol streams 316 are represented in the frequency domain and may be converted into N parallel time domain sample streams 318 by IFFT component 320.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of guard insertion component 326 may then be upconverted to a desired transmit frequency band by a radio frequency (RF) front end 328. An antenna 330 may then transmit the resulting signal 332.

In some aspects, Rx chain 304 may utilize OFDM/OFDMA. In some aspects, one or more components of Rx chain 304 may be implemented in receive processor 258, MIMO detector 256, MOD/DEMOD 254, and/or controller/processor 280, as described above in connection with FIG. 2. In some aspects, Rx chain 304 may be implemented in UE 120 for receiving data 306 (e.g., downlink data, a downlink reference signal, and/or downlink control information) from base station 110 on a downlink channel.

A transmitted signal 332 is shown traveling over a wireless channel 334 from Tx chain 302 to Rx chain 304. When a signal 332' is received by an antenna 330', the received signal 332' may be downconverted to a baseband signal by an RF front end 328'. A guard removal component 326' may then remove the guard interval that was inserted between OFDM/OFDMA symbols by guard insertion component 326.

The output of guard removal component 326' may be provided to an S/P converter 324'. The output may include an OFDM/OFDMA symbol stream 322', and S/P converter 324' may divide the OFDM/OFDMA symbol stream 322' into N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by mapper 312, thereby outputting N parallel data streams 310'. A P/S converter 308' may combine the N parallel data streams 310' into a single data stream 306'. Ideally, data stream 306' corresponds to data 306 that was provided as input to Tx chain 302. Data stream 306' may be decoded into a decoded data stream 303' by decoder 307'.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4:
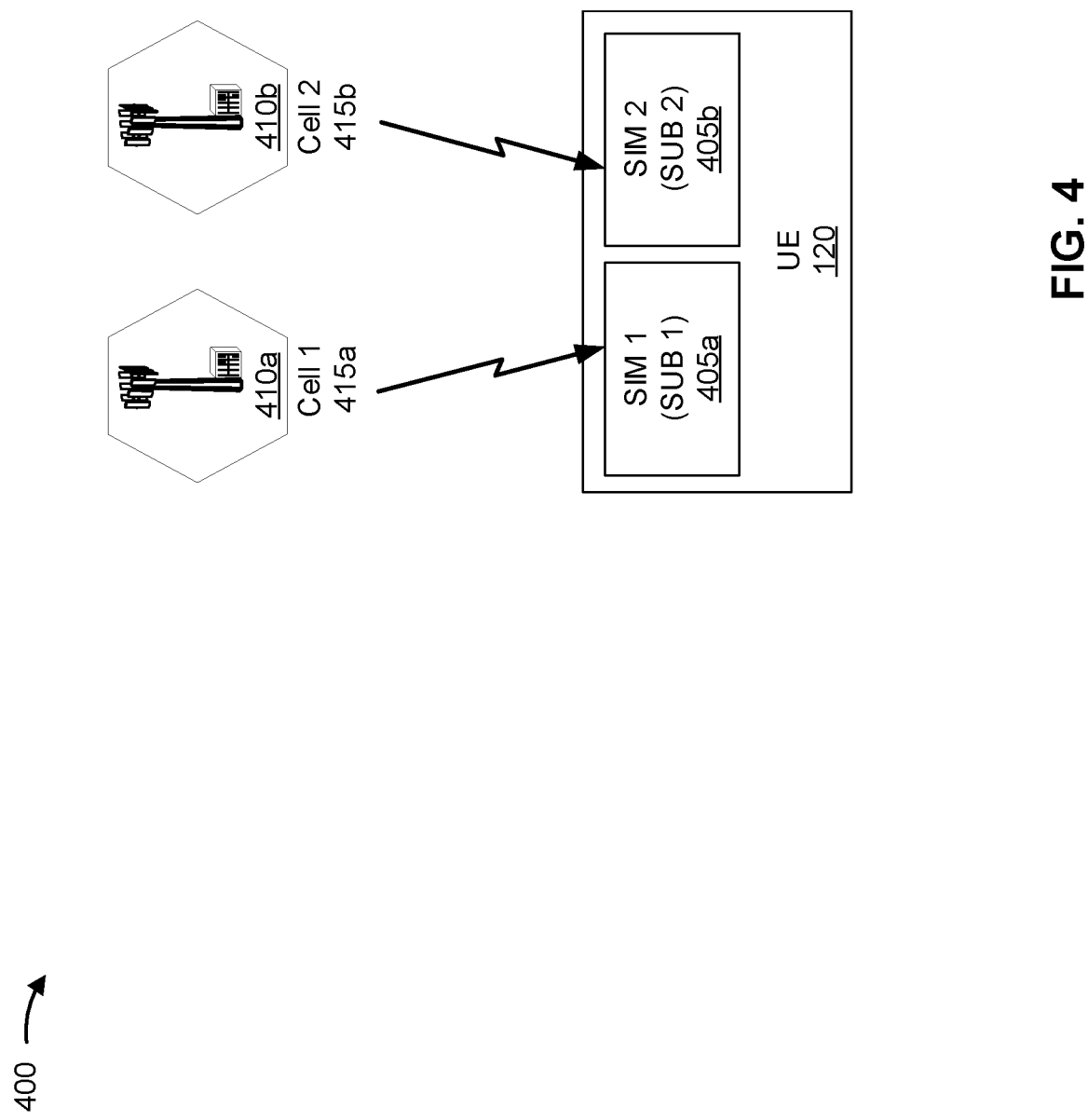
FIG. 4 is a diagram illustrating an example of a multiple SIM (multi-SIM) UE, in accordance with the present disclosure.

FIG. 4 is a diagram illustrating an example 400 of a multiple SIM (multi-SIM) UE, in accordance with the present disclosure. As shown in FIG. 4, a UE 120 may be a multi-SIM UE that includes multiple SIMs (two or more SIMs), shown as a first SIM 405a and a second SIM 405b. The first SIM 405a may be associated with a first subscription (shown as SUB 1), and the second SIM 405b may be associated with a second subscription (shown as SUB 2). A subscription may be a subscription with a network operator (for example, a mobile network operator (MNO)) that enables the UE 120 to access a wireless network (for example, a radio access network (RAN)) associated with the network operator.

A SIM 405 may be a removable SIM (for example, a SIM card) or an embedded SIM. A SIM 405 may include an integrated circuit that securely stores an international mobile subscriber identity (IMSI) and a security key, which are used to identify and authenticate a corresponding subscription associated with the SIM 405. In some cases, a SIM 405 may store a list of services that the UE 120 has permission to access using a subscription associated with the SIM 405, such as a data service or a voice service, among other examples. "SIM" and "subscription" may be used interchangeably herein.

As further shown in FIG. 4, the UE 120 may communicate (for example, in a connected mode, an idle mode, or an inactive mode) with a first base station 410a via a first cell 415a (shown as Cell 1) using the first SIM 405a. In this case, a first subscription (SUB 1) of the UE 120 may be used to access the first cell 415a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 410b via a second cell 415b (shown as Cell 2) using the second SIM 405b. In this case, a second subscription (SUB 2) of the UE 120 may be used to access the second cell 415b (for example, using a second IMSI for UE identification, using a second security key for UE authentication, using a second list of services that the UE 120 is permitted to access using the second subscription, or by counting data or voice usage on the second cell against the second subscription, among other examples).

The first base station 410a and/or the second base station 410b may include one or more of the base stations 110 described above in connection with FIG. 1. Although the first cell 415a and the second cell 415b are shown as being provided by different base stations, in some aspects, the first cell 415 and the second cell 415b may be provided by the same base station. Thus, in some aspects, the first base station 410a and the second base station 410b may be integrated into a single base station.

In some cases, the UE 120 may be capable of operating in a multi-SIM multiple standby (MSMS) mode, such as a dual SIM dual standby (DSDS) mode (e.g., when the UE 120 is associated with two subscriptions). Additionally, or alternatively, the UE 120 may be capable of operating in a multi-SIM multiple active (MSMA) mode, such as a dual SIM dual active (DSDA) mode (e.g., when the UE 120 is associated with two subscriptions).

In a DSDA mode, the UE 120 is capable of concurrent active communication using both SIMS of the UE 120. Thus, a UE 120 in the DSDA mode is capable of communicating using the first SIM 405a (and the first subscription) at the same time as communicating using the second SIM 405b (and the second subscription). For example, when the UE 120 is in an active session (e.g., a voice call or another latency sensitive service, such as online gaming, stock trading, or an over-the-top (OTT) service) using the first SIM 405a, the UE 120 is capable of receiving a notification of a voice call using the second SIM 405b without interrupting communications that use the first SIM 405a, and without tuning or switching away from the first cell 415a to tune to the second cell 415b.

In a DSDS mode, the UE 120 is not capable of concurrent active communication using both SIMS of the UE 120. Thus, a UE 120 in the DSDS mode is not capable of communicating using the first SIM 405a (and the first subscription) at the same time as communicating using the second SIM 405b (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples.

In some examples, a UE 120 may be capable of operating in a DSDA mode for a first combination of RATs, and the UE 120 may not be capable of operating in a DSDA mode for a second combination of RATs. For example, the UE 120 may be capable of operating in a DSDA mode for NR+NR, where the first cell 415*a* (as well as the first SIM 405*a* and the first subscription) uses an NR RAT and the second cell 415*b* (as well as the second SIM 405*b* and the second subscription) also uses the NR RAT. However, the UE 120 may not be capable of operating in a DSDA mode for NR+LTE, where one of the first cell 415*a* (as well as the first SIM 405*a* and the first subscription) uses an NR RAT and the second cell 415*b* (as well as the second SIM 405*b* and the second subscription) uses an LTE RAT (or vice versa). In some aspects, the UE 120 may not be capable of operating in the DSDA mode for the second combination of RATs (e.g., NR+LTE), but be capable of operating in a DSDS mode for the second combination of RATs. This UE design reduces design costs as compared to enabling the UE 120 to operate using the DSDA mode for the second combination of RATs.

In some cases, the UE 120 may be a single receiver (SR) (sometimes also referred to as single radio) multi-SIM UE, such as an SR multi-SIM multiple standby (SR-MSMS) UE or a single receiver dual SIM dual standby (SR-DSDS) UE, among other examples. A multi-SIM UE may be capable of switching between two separate mobile network services, may include hardware for maintaining multiple connections (e.g., one connection per SIM) in a standby state, or may include hardware (e.g., multiple transceivers) for maintaining multiple network connections at the same time, among other examples. However, an SR-DSDS UE or an SR-MSMS UE may only be capable of receiving data on one connection at a time because radio frequency resources are shared between the multiple subscriptions. For example, an SR-DSDS UE or an SR-MSMS UE may be associated with multiple subscriptions but may include only a single transceiver shared by the multiple subscriptions, a single transmit chain shared by the multiple subscriptions, or a single receive chain shared by the multiple subscriptions, among other examples.

Alternatively, in some cases, the UE 120 may have dual receive, dual SIM, dual standby (DR-DSDS) capabilities, which may allow both SIMs 405*a*, 405*b* to concurrently receive, although only one SIM can transmit at a time (e.g., on a time-sharing basis). For example, transmit and receive operations may be enabled for the first SIM 405*a* in a connected mode, and only receive operations may be enabled for the second SIM 405*b* (e.g., in an idle mode) while the first SIM 405*a* is in connected mode, or vice versa.

As indicated above, FIG. 4 is provided as an example. Other examples may differ from what is described with regard to FIG. 4.

Figure 5:
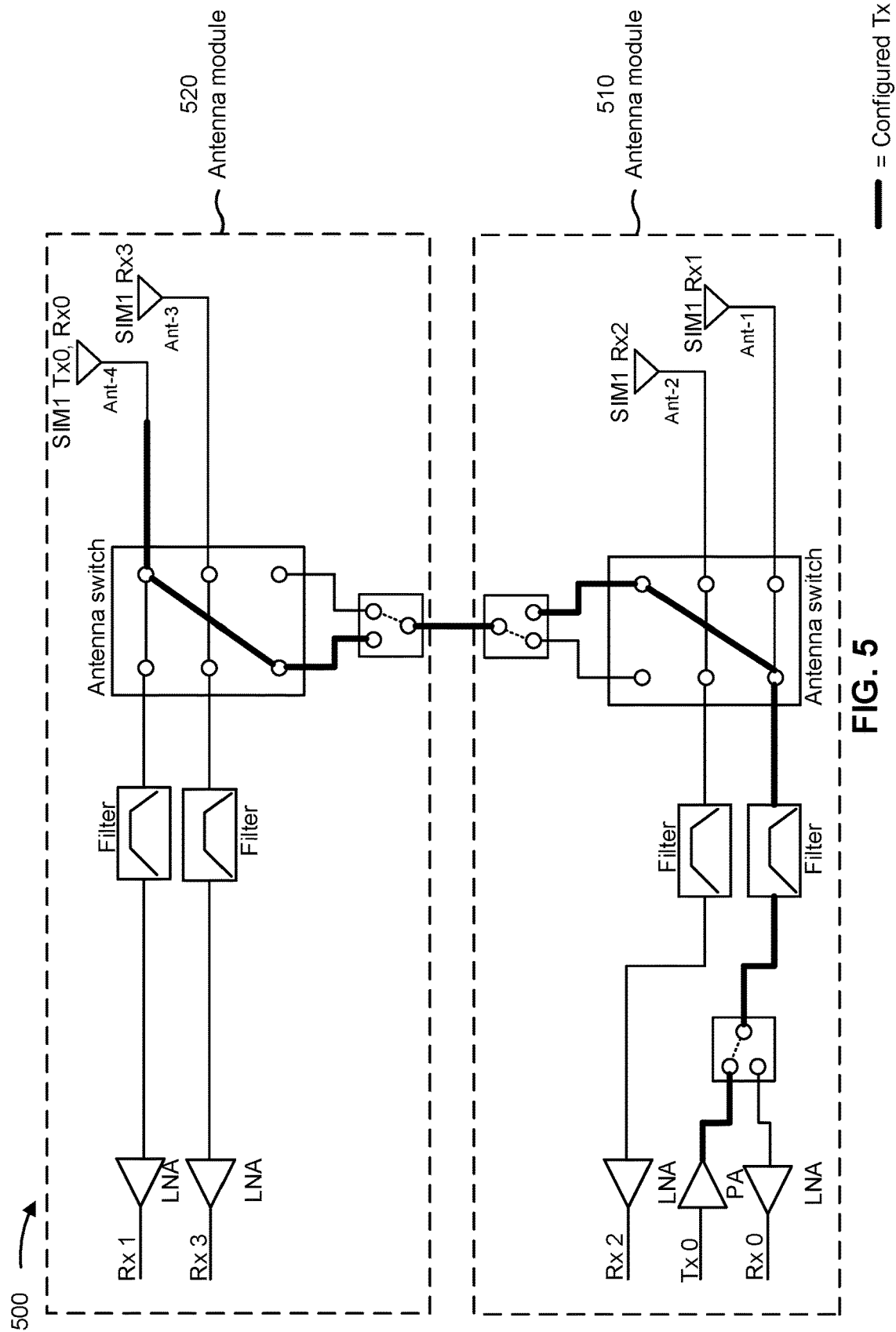
FIG. 5 is a diagram illustrating an example of a transmit configuration for a multi-SIM UE, in accordance with the present disclosure.

FIG. 5 is a diagram illustrating an example 500 of a transmit configuration for a multi-SIM UE, in accordance with the present disclosure. In some cases, as described herein, example 500 relates to concurrent transmit and receive operations that may occur in a multi-SIM UE having DR-DSDS capabilities, whereby a first SIM (shown in FIG. 5 as SIM1) may operate in a connected mode in which Tx and Rx operations are enabled while a second SIM may operate in an idle mode in which only Rx operations are enabled. Accordingly, in some cases, Rx activity associated with the second SIM may be concurrent with Tx activity associated with the first SIM. For example, the second SIM may operate in accordance with a discontinuous reception (DRX) cycle. The DRX cycle may include an active time (or an on duration) during which the second SIM is configured to monitor for and/or receive signals (e.g., paging signals) and an inactive time during which the second SIM is configured to enter a sleep state (e.g., not monitor for signals and/or not conduct Rx operations).

For example, DR-DSDS concurrency may be enabled for the second SIM associated with the multi-SIM UE when the second SIM is in an idle mode. For example, the DR-DSDS concurrency may generally allow one SIM to conduct Rx operations concurrently with another SIM conducting Tx operations or Rx operations. In some cases, however, the first SIM and the second SIM may be associated with different wireless networks that are provided by different network operators, whereby the concurrent activity associated with the two SIMS may not be synchronized. In other words, Rx activity scheduled for the second SIM operating in idle mode may at least partially overlap in a time domain with Tx activity scheduled for the first SIM operating in connected mode.

As shown in FIG. 5, a UE may include one or more antenna modules. "Antenna module" may refer to one or more hardware components of the UE associated with one or more antennas of the UE. For example, as shown in FIG. 5, an antenna module may include one or more antennas, one or more switches (e.g., antenna switches), one or more power amplifiers (PAs), one or more low noise amplifiers (LNAs), and/or one or more filters, among other examples. An antenna module may sometimes be referred to as a hardware module, an RF front end module, and/or an RF front end, among other examples. An antenna module may be associated with one or more RF paths (e.g., one or more Tx paths and/or one or more Rx paths). As used herein, "path" and "chain" may be used interchangeably (e.g., a Tx path may refer to a Tx chain and/or an Rx path may refer to an Rx chain).

As shown in FIG. 5, the first SIM and the second SIM may share common front end components, such as antennas and/or antenna modules. For example, the first SIM and the second SIM may operate using the same, or a similar, operating frequency (e.g., the first SIM and the second SIM may operate using the same frequency band group). Therefore, the first SIM and the second SIM may share Tx paths and/or Rx paths of the UE.

In some cases, the UE may support antenna switching for improved antenna selection. For example, the availability of multiple antennas may provide spatial diversity for communications because different antennas may experience different channel conditions. By using better antennas or avoiding worse antennas, a UE may improve communication reliability and performance. For example, an antenna switching procedure (e.g., an antenna switch diversity procedure and/or a sounding reference signal (SRS) antenna switch procedure) may enable the UE to dynamically select one or more antennas, among all the available antennas, that are more suitable for transmission and reception compared to other antennas. For example, the UE may perform measurements (e.g., RSRP measurements, signal-to-noise ratio (SNR) measurements, and/or Tx power headroom measurements) using all of the available antennas by switching a Tx path of the UE between the available antennas (e.g., and performing the measurements on each antenna). The UE may select an antenna for the Tx path of the UE based at least in part on the measurements (e.g., the UE may select an antenna with a best or highest measurement value).

For example, the UE may include multiple antennas and/or multiple antenna modules with multiple antenna switches that allow a Tx chain to select a particular transmit antenna (e.g., based on an antenna switch diversity (Asdiv) technique and/or an SRS antenna switching configuration) via the antenna switches in the antenna modules. Accordingly, the UE may prepare and/or program analog and/or digital components in the Tx chain for transmission, which may include toggling one or more antenna switches to connect the Tx chain to a particular transmit antenna.

In some cases, as shown in FIG. 5, a UE may include more than one antenna module to support all of the antennas of the UE. For example, the UE may include a first antenna module 510 to support a first antenna (e.g., Ant-1) and a second antenna (e.g., Ant-2). The UE may include a second antenna module 520 to support a third antenna (e.g., Ant-3) and a fourth antenna (e.g., Ant-4). In some cases, to enable the UE to select any one of the available antennas of the UE for a Tx path (e.g., to support the antenna switching based antenna selection described above), a Tx path be routed from the first antenna module 510 to the second antenna module 520 (e.g., to enable the UE to use the third antenna or the fourth antenna as a Tx antenna). For example, the first antenna module 510 may be associated with an active or a configured power amplifier and the second antenna module 520 may not be associated with an active or a configured power amplifier. In some cases, the second antenna module 520 may include a power amplifier (not shown in FIG. 5), but the power amplifier may not be activated or configured (e.g., the UE may not be configured for uplink MIMO). A configuration in which an RF path may be routed between multiple antenna modules of the UE may be referred to as a cascaded switch configuration and/or a cascaded switch architecture, among other examples.

In some cases, for the first SIM operating in the connected mode, the UE may perform an antenna switching procedure to identify a best antenna to serve as the Tx antenna for the first SIM. As shown in FIG. 5, in some cases, the UE may select an antenna (e.g., the third antenna or the fourth antenna) associated with the second antenna module 520. Therefore, a configured Tx path (e.g., shown as the thicker line in FIG. 5) for the first SIM may be routed from the first antenna module 510 to the second antenna module 520 (e.g., using one or more switches and/or circuitry).

In some cases, an antenna module of the UE may be associated with a limitation that prohibits concurrent Tx and Rx operations (e.g., the antenna module may not support concurrent transmission and reception of signals using the antenna module). For example, an antenna module may be configured to support Tx activity only, Rx activity only, or both Tx activity and Rx activity. For an antenna module that supports Tx activity only or Rx activity only, if a Tx path is configured on the antenna module, then the UE may be unable to configure an Rx path on the same antenna module. Conversely, if an Rx path is configured on the antenna module, then the UE may be unable to configure a Tx path on the same antenna module.

Therefore, if a Tx path is configured for an antenna associated with the second antenna module 520 (e.g., as shown in FIG. 5) and the second antenna module 520 (and/or the first antenna module 510) does not support concurrent Tx and Rx operations, then the UE may be unable to configure an Rx path for the second SIM (e.g., due to the configured Tx path). For example, even if the Tx path and the Rx path are orthogonal in the second antenna module 520, the UE may be unable to configure the Rx path on the second antenna module 520 due to the limitation of the second antenna module 520 that prohibits concurrent Tx and Rx operations.

As a result, if the UE selects a Tx antenna for the first SIM to be the third antenna or the fourth antenna (e.g., using an antenna switching procedure, as described above), then the UE may be unable to support the concurrent Rx activity for the second SIM associated with the DR-DSDS mode, as described above. For example, for an active time associated with the second SIM operating in the idle mode, the UE may attempt to configure and/or program an Rx path for the Rx operations on the second SIM. However, due to the selected Tx antenna and/or the hardware limitations of the UE, the UE may be unable to configure and/or program the Rx path for the second SIM. Therefore, in some cases, the UE may be unable to support both the antenna switching based antenna selection feature and the DR-DSDS concurrency due to hardware limitations (e.g., of one or more antenna modules) of the UE.

Some techniques and apparatuses described herein enable antenna switching and dual receive concurrency for a multi-SIM UE in a dual receive mode, such as the DR-DSDS mode. For example, the multi-SIM UE may detect a hardware limitation, such as a limitation of an antenna module of the UE that prohibits concurrent Tx and Rx operations on the antenna module. In some aspects, the UE may detect that a first SIM (e.g., in a connected mode) requires multiple antenna modules (e.g., including one or more antenna modules having the limitation described above) for potential Tx paths for the first SIM (e.g., to support an antenna switching based antenna selection feature, as described above). In some aspects, the UE may detect that a currently configured Tx path for the first SIM is routed between multiple antenna modules (e.g., as shown in FIG. 5). During a DR-DSDS concurrency time (e.g., during an active time associated with the second SIM), the UE may configure the Tx path (and/or an antenna switching procedure) for the first SIM to use antennas that require only a single antenna module (e.g., a default antenna module and/or a default Tx path). Therefore, the UE may be enabled to configure an Rx path for the second SIM using a different antenna module that is not being used by the first SIM for Tx operations. After the expiration of the DR-DSDS concurrency time (e.g., after an active time associated with the second SIM), the UE may enable the Tx path (and/or an antenna switching procedure) for the first SIM to use all available antennas of the UE (e.g., to use antennas that require multiple antenna modules for the Tx path).

In other words, during the DR-DSDS concurrency time, the UE may limit an antenna switching capability for the first SIM (e.g., in the connected mode) to a single antenna module and may configure an Rx path for the second SIM (e.g., in the idle mode) using a different antenna module. After the DR-DSDS concurrency time, the UE may enable the first SIM to use a full or maximum antenna switching capability for Tx antenna selection for the first SIM.

As a result, the UE may be enabled to support both antenna switching and dual receive concurrency for a multi-SIM UE in a dual receive mode. This enables the UE to realize the benefits of improved antenna selection using an antenna switching procedure for a first SIM (e.g., as described above) while also supporting DR-DSDS concurrency for Rx operations on a second SIM (e.g., in the idle mode). Therefore, the UE may be enabled to select a best antenna for Tx operations on the first SIM while also supporting DR-DSDS concurrency for the Rx operations on the second SIM when an antenna module of the UE is associated with a limitation that that prohibits concurrent Tx operations and Rx operations on the antenna module.

As indicated above, FIG. 5 is provided as an example. Other examples may differ from what is described with regard to FIG. 5.

Figure 6:
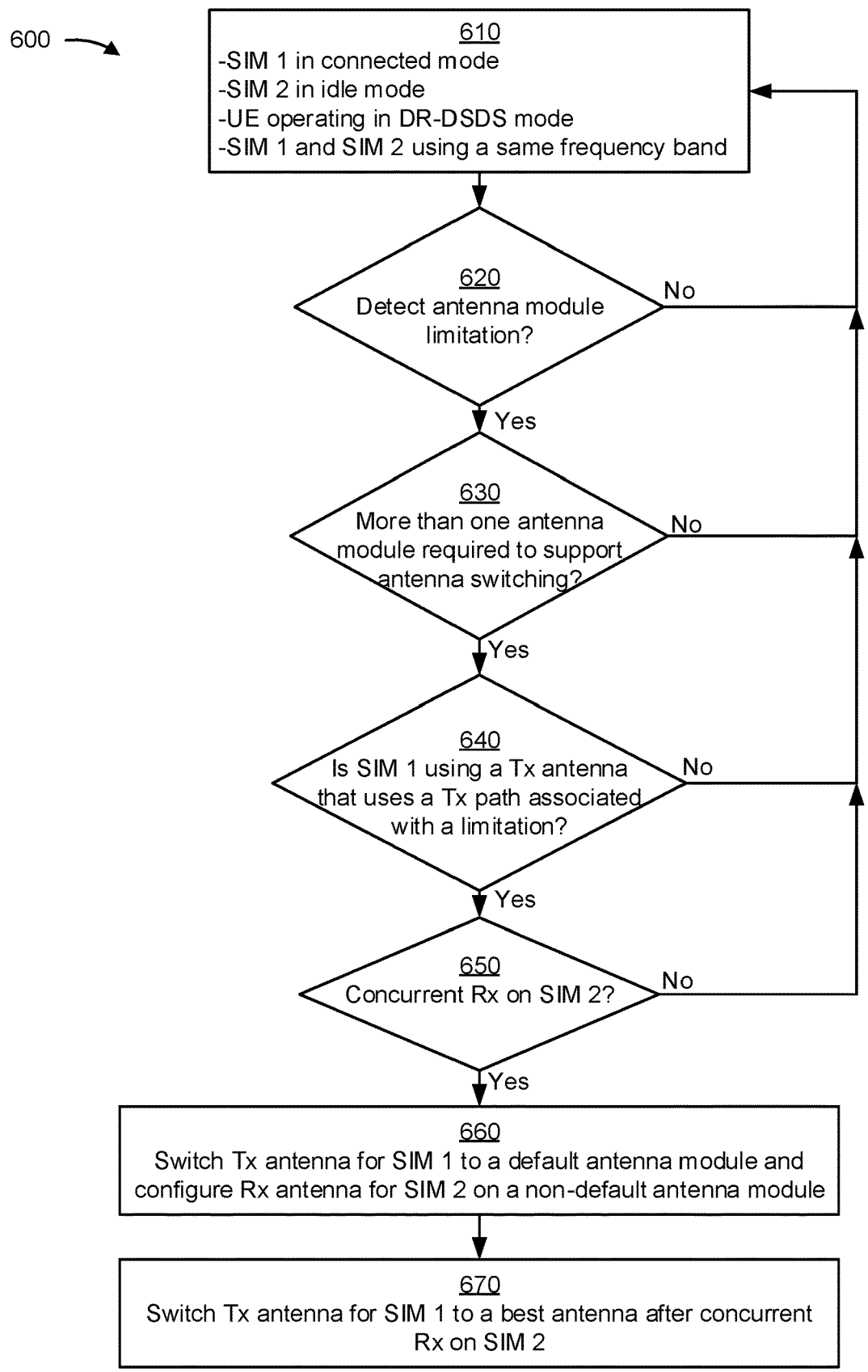
FIG. 6 is a diagram illustrating an example of antenna switching for a multi-SIM UE, in accordance with the present disclosure.

FIG. 6 is a diagram illustrating an example 600 of antenna switching for a multi-SIM UE, in accordance with the present disclosure. The operations shown in example 600 may be performed by a UE (e.g., UE 120). For example, the UE may be a multi-SIM UE associated with two or more SIMS in a similar manner as described above in connection with FIG. 4. Example 600 relates to enabling an antenna switching based antenna selection feature and a DR-DSDS concurrency (e.g., to enable concurrent Tx operations for a first SIM and Rx operations for a second SIM) feature on the UE when the UE includes one or more antenna modules having a limitation that prohibits concurrent Tx operations and Rx operations on the antenna module (e.g., an antenna module of the UE may not support concurrent transmission and reception of signals using the antenna module).

As shown in FIG. 6, the UE may be operating in one or more operating conditions associated with a multi-SIM mode (block 610). For example, a first SIM (e.g., SIM 1) of the UE may be operating in a connected mode (e.g., with both Tx operations and Rx operations). A second SIM (e.g., SIM 2) of the UE may be operating in an idle mode (e.g., with only Rx operations). The UE may be operating in a DR-DSDS mode. The first SIM and the second SIM may be operating using a same, or similar, operating frequency (e.g., the first SIM and the second SIM may be operating using a same frequency band group, such as an ultra-high band group or another band group as defined, or otherwise fixed, by a wireless communication standard). Therefore, the first SIM and the second SIM may share front end components (e.g., antennas and/or antenna modules) for Tx operations and Rx operations because the first SIM and the second SIM may be operating using a same, or similar, operating frequency. For example, the UE may be configured with Tx paths and Rx paths that are configured for an operating frequency and/or a frequency band group. Therefore, when the first SIM and the second SIM are operating using the same frequency band group, the first SIM and the second SIM may use common front end components of the UE for communications.

The UE may detect whether an antenna module of the UE has a limitation that prohibits concurrent Tx operations and Rx operations on the antenna module (block 620). For example, the UE may detect that an Rx path for the second SIM cannot be configured or programmed on an antenna module if a Tx path for the first SIM is current configured or programmed using the same antenna module (e.g., on the second antenna module as shown and described above in connection with FIG. 5). In some aspects, the UE may detect that a configuration of an antenna module indicates that the antenna module does not support concurrent transmission and reception of signals. In some aspects, the configuration of the antenna module may indicate that a first antenna associated with the antenna module cannot be configured for receive operations at a same time as (or at a time that at least partially overlaps with) a second antenna associated with the antenna module being configured for transmit operations. In some aspects, the UE may detect that the antenna module does not support concurrent transmission and reception of signals based at least in part on a register control setting of the antenna module (e.g., an RF front end register control setting and/or a mobile industry processor interface (MIPI) register control setting). For example, the configuration of the antenna module may indicate that an Rx path cannot be configured or programmed on the antenna module if a Tx path is currently configured or programmed on the antenna module, even if the Tx path and the Rx path are associated with different physical antenna ports (e.g., are associated with different antennas). If the configuration of the antenna module may indicate that an Rx path cannot be configured or programmed on the antenna module if a Tx path is currently configured or programmed on the antenna module, then the UE may determine that the antenna module does not support concurrent Tx and Rx activity (e.g., for the DR-DSDS mode). If the UE determines that there are no antenna modules of the UE have a limitation that prohibits concurrent Tx operations and Rx operations on the antenna module (block 620—No), then the UE may continue operations in the DR-DSDS mode without any further modifications.

If the UE determines that there is at least one antenna module of the UE that has a limitation that prohibits concurrent Tx operations and Rx operations on the antenna module (block 620—Yes), then the UE may determine whether more than one antenna modules are required to support an antenna switching procedure for the UE and/or for the first SIM (block 630). For example, the UE may determine whether more than one independently controlled or configured antenna module is needed to support the antenna switching procedure for the UE and/or for the first SIM. For example, the antenna switching procedure (e.g., using the Asdiv technique and/or an SRS antenna switching configuration) may be associated with multiple antennas of the UE. The UE may determine whether multiple antenna modules may be required to support a Tx chain (e.g., in a cascaded switch configuration) to enable the UE to switch between all of the multiple antennas. If the UE determines that multiple antenna modules are not required to support an antenna switching procedure for the UE and/or for the first SIM (block 630—No), then the UE may continue operations in the DR-DSDS mode without any further modifications.

If the UE determines that multiple antenna modules are required to support an antenna switching procedure for the UE and/or for the first SIM (block 630—Yes), then the UE may determine whether a current Tx path configuration for the first SIM is using an antenna module associated with a limitation as described above (block 640). For example, the UE and/or the first SIM may perform antenna switching to select a best antenna (e.g., an antenna associated with a highest or best measurement parameter) to serve as the Tx antenna for the first SIM. The UE may transmit one or more signals using the selected Tx antenna and the antenna module associated with the selected Tx antenna. The UE may determine or detect whether the antenna module associated with the selected Tx antenna for the first SIM is using a Tx path associated with a limitation that prevents concurrent Tx operations and Rx operations. For example, the UE may determine or detect whether the Tx path for the selected Tx antenna for the first SIM is using multiple antenna modules (e.g., in a similar manner as described above in connection with FIG. 5). In some aspects, the UE may determine or detect whether the Tx path for the selected Tx antenna for the first SIM is using an antenna module associated with a limitation that prohibits concurrent Tx operations and Rx operations on the antenna module (e.g., detected by the UE as described above). If the current Tx path configuration for the first SIM is not using an antenna module associated with a limitation as described above (block 640—No), then the UE may continue operations in the DR-DSDS mode without any further modifications.

If the current Tx path configuration for the first SIM is using an antenna module associated with a limitation as described above (block 640—Yes), then the UE may determine or detect whether there is concurrent Rx operations associated with the second SIM (block 650). For example, Rx operations associated with the second SIM operating in the idle mode may occur periodically and/or predictably (e.g., in accordance with a DRX cycle). For example, the idle mode of the second SIM may be associated with an active time (or an on duration) during which Rx operations occur on the second SIM and an inactive time (or an off duration) during which no Rx operations occur on the second SIM. The UE may determine or detect whether the second SIM is in an active time (e.g., or an active time is upcoming). If the UE determines or detects that there are no concurrent Rx operations associated with the second SIM (block 650—No), then the UE may continue operations in the DR-DSDS mode without any further modifications. For example, the UE may determine or detect that the second SIM is operating in an inactive time associated with the idle mode. Therefore, no modifications to the Tx antenna and/or the Tx path for the first SIM are required as the second SIM is currently not performing any Rx operations.

If the UE determines or detects that there is concurrent Rx operations associated with the second SIM (block 650—Yes), then the UE may switch the Tx antenna for the first SIM to a default antenna module and may configure an Rx antenna for the second SIM on an antenna module that is not the default antenna module (block 660). "Default antenna module" may refer to an antenna module of the UE that is associated with an active or enabled power amplifier and/or that is associated with a primary Tx path for the UE. For example, in the configuration described above in connection with FIG. 5, the first antenna module 510 may be the default antenna module. For example, the selected Tx antenna for the first SIM may be a first antenna associated with a first antenna module (e.g., an antenna module that is not the default antenna module). The UE may switch the selected Tx antenna for the first SIM from the first antenna to a second antenna associated with the default antenna module. The UE may configure an Rx path for the second SIM to use a third antenna associated with the antenna module that is not the default antenna module.

For example, the UE may configure and/or program a Tx path for the first SIM to use an antenna (e.g., the second antenna) associated with the default antenna module. The UE may configure and/or program an Rx path for the second SIM to use an antenna (e.g., the third antenna) associated with an antenna module that is not the default antenna module. The UE may transmit one or more signals using the selected Tx antenna (e.g., associated with the default antenna module) on the first SIM. Additionally, or alternatively, the UE may receive one or more signals using the Rx antenna (e.g., associated with an antenna module that is not the default antenna module) on the second SIM. For example, the UE may receive one or more signals using the Rx antenna at a time that at least partially overlaps with a transmission time associated with transmitting a signal using the selected Tx antenna (e.g., associated with the default antenna module) on the first SIM. In this way, the UE may ensure that concurrent activity associated with the DR-DSDS mode may occur when an antenna module is associated with a limitation (e.g., as described above) by ensuring that Tx operations for the first SIM and Rx operations for the second SIM are limited to separate antenna modules.

For example, the UE may refrain from switching the Tx antenna associated with the first SIM to an antenna associated with the non-default antenna module for a duration of the active time of the idle mode associated with the second SIM based at least in part on configuring an antenna associated with the non-default antenna module for receive operations associated with the active time of the idle mode. Therefore, even if an antenna associated with the non-default antenna module is associated with a best measurement parameter (e.g., determined by performing antenna switching, as described above), the UE may refrain from switching the Tx antenna for the first SIM to the antenna associated with the non-default antenna module while the second SIM is in the active time of the idle mode (e.g., to enable the DR-DSDS concurrency of Tx operations and Rx operations).

In some aspects, the UE may select the second antenna to serve as the Tx antenna for the first SIM based at least in part on the second antenna being associated with a best or highest measurement parameter among the antennas associated with the default antenna module. For example, the UE may measure the measurement parameter for the antenna of the UE as part of an antenna switching procedure (e.g., as described above). The UE may select an antenna, from the antennas associated with the default antenna module, to serve as the Tx antenna for the first SIM based at least in part on the measured measurement parameters.

In some aspects, after an expiration of the concurrent Rx operations associated with the second SIM, the UE may enable a Tx antenna for the first SIM to be switched to a best antenna of the UE (e.g., the selected Tx antenna for the first SIM may no longer be limited to antennas associated with the default antenna module) (block 670). For example, the UE may detect that the second SIM has transitioned to an inactive time or an off duration associated with the idle mode. Therefore, the second SIM may no longer require a configured Rx path for Rx operations on the second SIM. As a result, the UE may enable a Tx antenna for the first SIM to be switched to an antenna associated with the default antenna module and/or an antenna associated with another antenna module. In other words, during the concurrent Rx operations associated with the second SIM, the UE may limit an antenna switching capability (e.g., an Asdiv capability and/or an SRS antenna switching capability) for selecting a Tx antenna on the first SIM to antennas associated with the default antenna module. After an expiration of the concurrent Rx operations associated with the second SIM, the UE may return the antenna switching capability (e.g., an Asdiv capability and/or an SRS antenna switching capability) for selecting a Tx antenna on the first SIM to a full or maximum capability (e.g., enabling the UE to switch between antennas associated with the default antenna module and/or a non-default antenna module) to select a best antenna to serve as the Tx antenna for the first SIM. The full or maximum capability may indicate all antennas of the UE that are suitable for the antenna switching procedure. For example, as described above, during the Rx concurrency with the second SIM, the first SIM may use a number of antennas that is less than all antennas of the UE that are suitable for the antenna switching procedure (e.g., a limited or reduced Asdiv capability and/or an SRS antenna switching capability).

For example, if an antenna associated with the Tx path configuration for the first SIM that used an antenna module associated with a limitation (e.g., detected above as described in connection with block 640) is still a best antenna after the expiration of the concurrent Rx operations associated with the second SIM, then the UE may switch the Tx antenna for the first SIM back to the antenna associated with the Tx path configuration for the first SIM that used the antenna module associated with the limitation. The UE may transmit one or more signals using an antenna selected based at least in part on performing antenna switching among all available antennas (e.g., associated with default antenna module and/or a non-default antenna module) after the expiration of the concurrent Rx operations associated with the second SIM.

As a result, the UE may be enabled to support both antenna switching and dual receive concurrency for a multi-SIM UE in a dual receive mode. This enables the UE to realize the benefits of improved antenna selection using an antenna switching procedure for a first SIM (e.g., as described above) while also supporting DR-DSDS concurrency for Rx operations on a second SIM (e.g., in the idle mode). Therefore, the UE may be enabled to select a best antenna for Tx operations on the first SIM while also supporting DR-DSDS concurrency for the Rx operations on the second SIM when an antenna module of the UE is associated with a limitation that that prohibits concurrent Tx operations and Rx operations on an antenna module.

As indicated above, FIG. 6 is provided as an example. Other examples may differ from what is described with regard to FIG. 6.

Figure 7A:
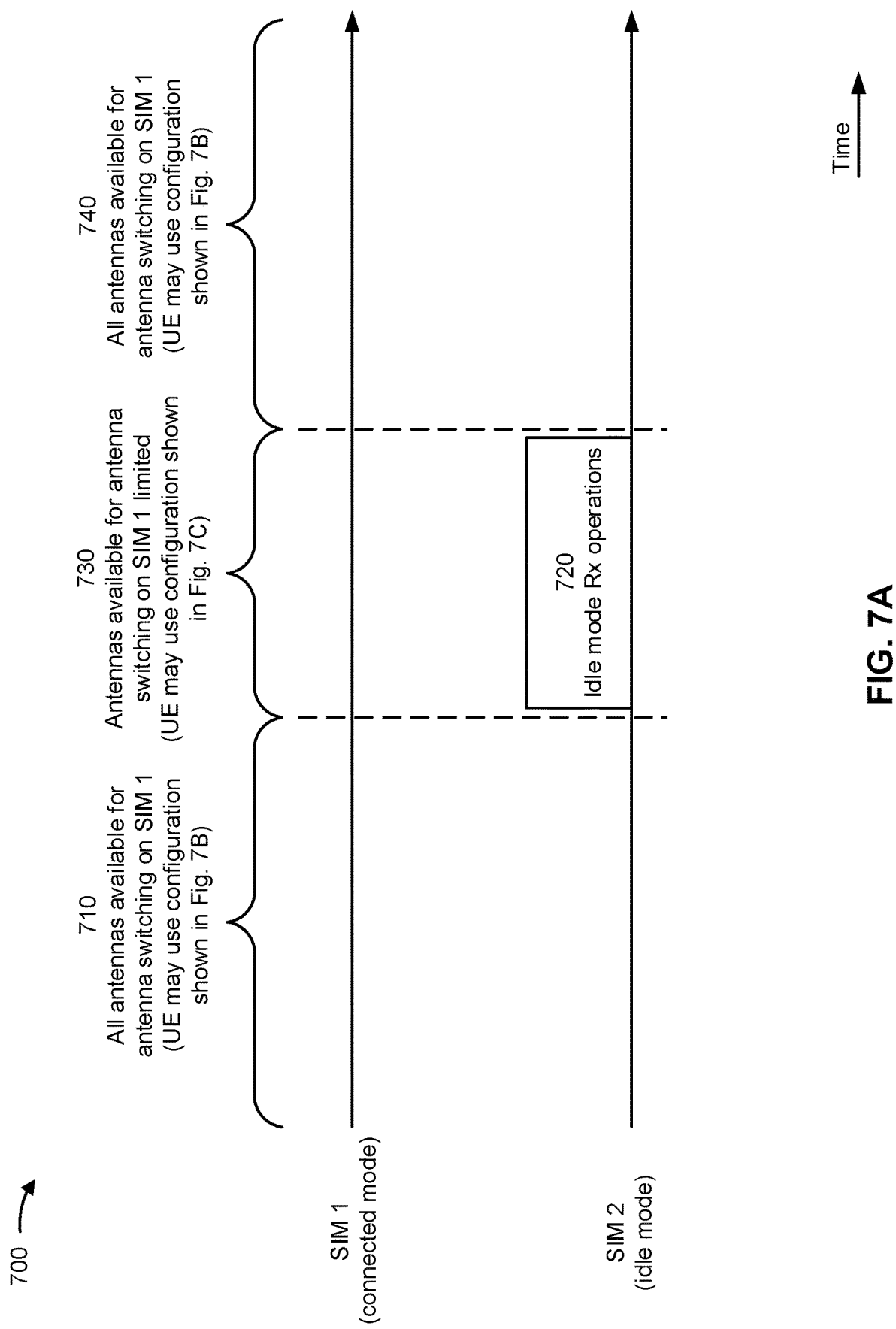
FIG. 7A is a diagram illustrating example operations performed by a first SIM of a UE operating in a connected mode and a second SIM of the UE operating in an idle mode to support antenna switching and dual receive, dual SIM, dual standby (DR-DSDS) concurrency, in accordance with the present disclosure.
Figure 7B:
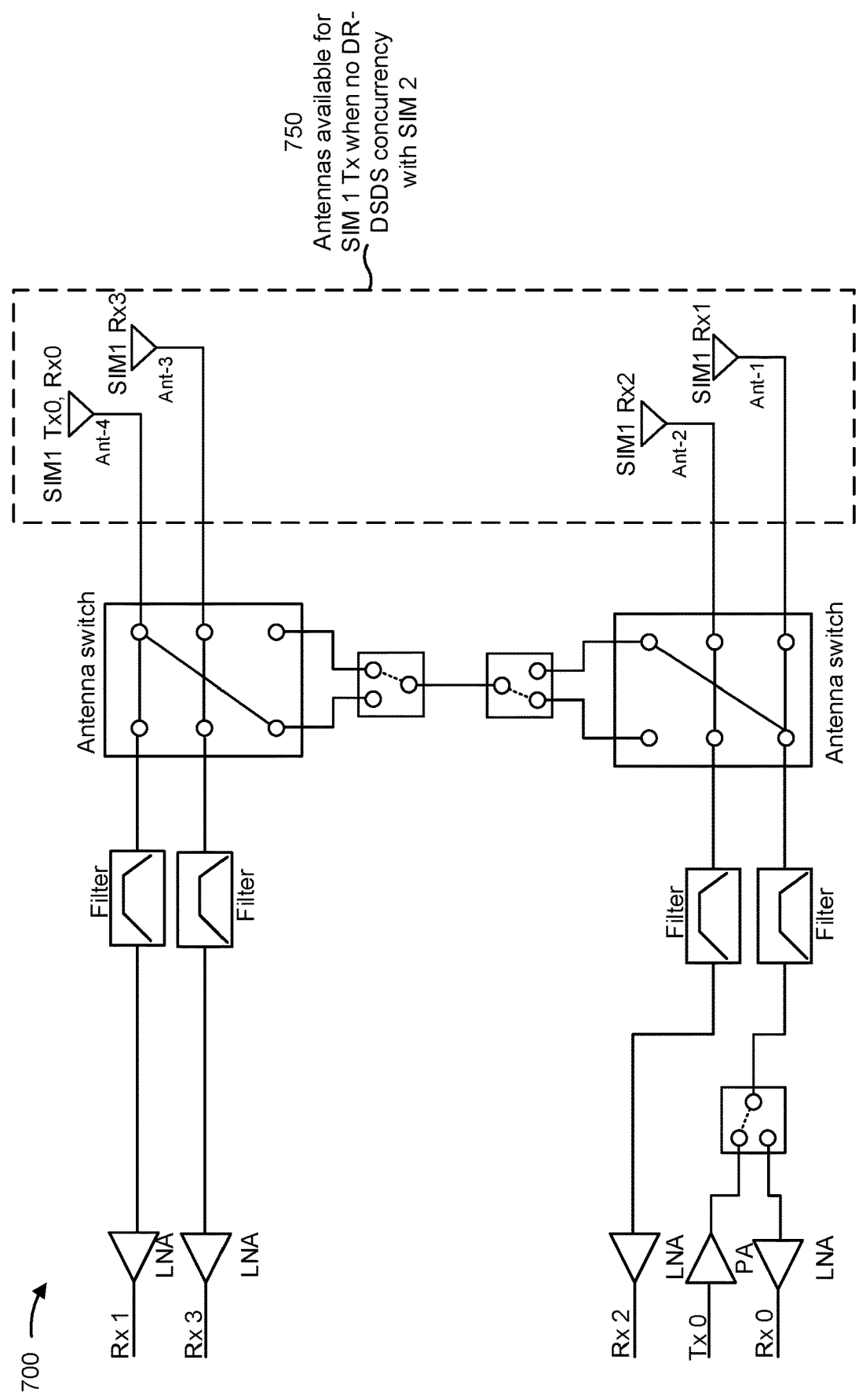
FIG. 7B is a diagram illustrating an example antenna configuration for a UE to support antenna switching for a first SIM when there is not DR-DSDS concurrent activity for a second SIM, in accordance with the present disclosure.
Figure 7C:
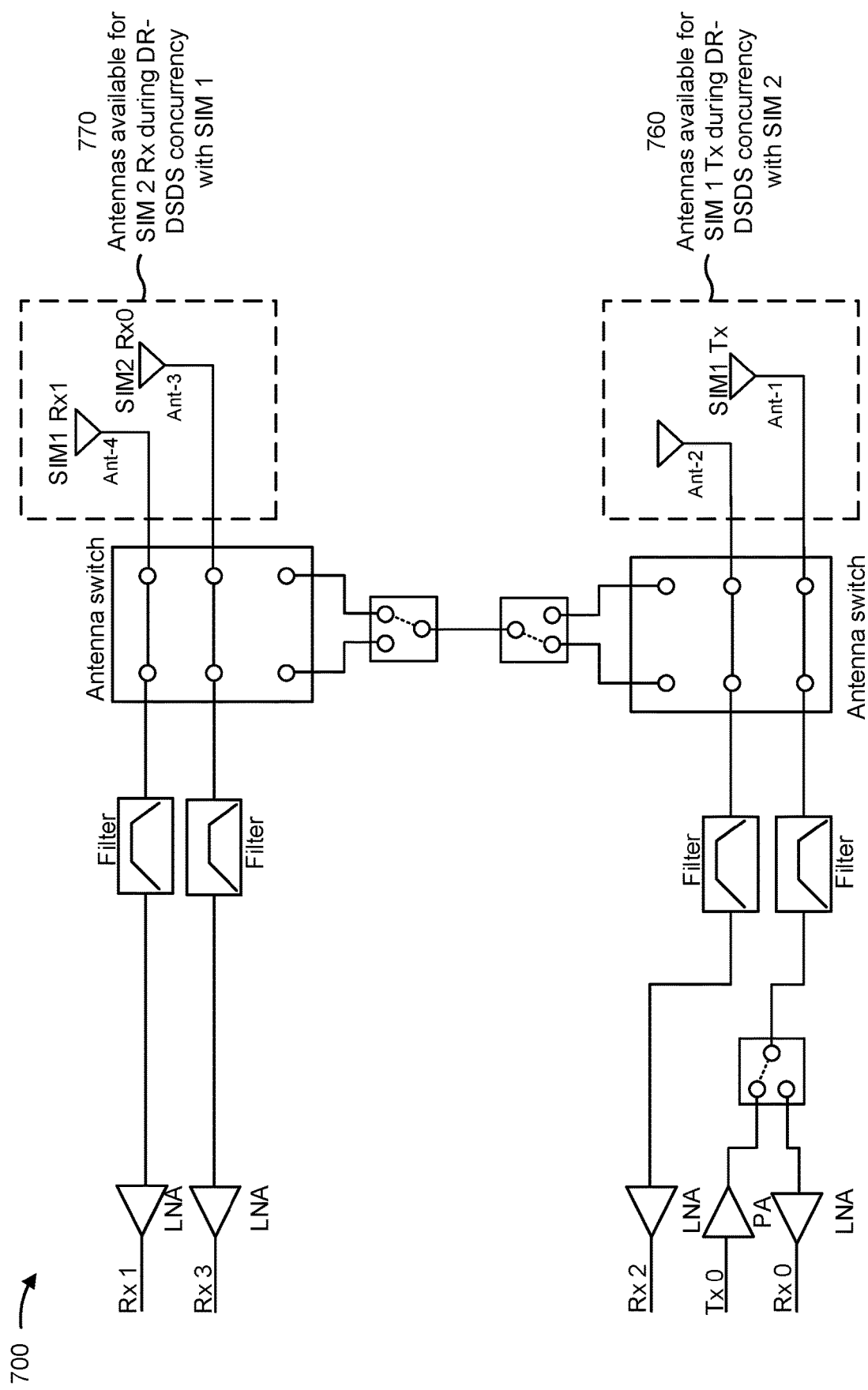
FIG. 7C is a diagram illustrating an example antenna configuration for a UE to support antenna switching for a first SIM when there is DR-DSDS concurrent activity for a second SIM, in accordance with the present disclosure.

FIGS. 7A-7C are diagrams illustrating an example 700 of antenna switching for a multi-SIM UE, in accordance with the present disclosure. The operations shown in example 700 may be performed by a UE (e.g., UE 120). For example, the UE may be a multi-SIM UE associated with two or more SIMS in a similar manner as described above in connection with FIGS. 4 and 6.

FIG. 7A is a diagram illustrating example operations performed by a first SIM of the UE operating in a connected mode and a second SIM of the UE operating in an idle mode to support antenna switching and DR-DSDS concurrency, in accordance with the present disclosure (e.g., when an antenna module of the UE is associated with a limitation that that prohibits concurrent Tx operations and Rx operations on an antenna module). FIG. 7B is a diagram illustrating an example antenna configuration for a UE to support antenna switching for a first SIM when there is not DR-DSDS concurrent activity for a second SIM, in accordance with the present disclosure. FIG. 7C is a diagram illustrating an example antenna configuration for a UE to support antenna switching for a first SIM when there is DR-DSDS concurrent activity for a second SIM, in accordance with the present disclosure.

As shown in FIG. 7A, and by reference number 710, while there are no concurrent Rx operations on the second SIM (e.g., while the second SIM is in an inactive time or an off duration), all suitable antennas may be available for use by the first SIM for antenna switching based antenna selection. For example, as shown in FIGS. 7B and 7C, the UE may include a first antenna module and a second antenna module. The first antenna module may be associated with a first antenna (e.g., Ant-1) and a second antenna (e.g., Ant-2). The second antenna module may be associated with a third antenna (e.g., Ant-3) and a fourth antenna (e.g., Ant-4). While the antenna configurations shown in FIGS. 7B and 7C include two antenna modules and four antennas, different numbers of antennas and/or antenna modules are possible. Additionally, or alternatively, the UE may include additional components (e.g., additional filters, switches, power amplifiers, and/or low noise amplifiers) in the antenna configuration not shown in FIGS. 7B and 7C.

As shown in FIG. 7B, and by reference number 750, the first antenna, the second antenna, the third antenna, and the fourth antenna may be available for Tx operations on the first SIM when there is no DR-DSDS concurrency with the second SIM (e.g., while the second SIM is in an inactive time or an off duration). Therefore, the UE may be enabled to select a best antenna among the first antenna, the second antenna, the third antenna, and the fourth antenna based at least in part on performing antenna switching among the different antennas and measuring measurement parameters on each antenna (e.g., using the Asdiv technique and/or an SRS antenna switching configuration). The UE may use the best antenna (e.g., the antenna associated with the highest or best measurement parameter) among the first antenna, the second antenna, the third antenna, and the fourth antenna to serve as the Tx antenna for the first SIM (e.g., while the second SIM is in an inactive time or an off duration).

Returning to FIG. 7A, the second SIM may be associated with Rx operations in the idle mode. For example, as shown by reference number 720, the second SIM may be associated with an active time or an on duration during which an Rx path is configured for the second SIM to perform Rx operations (e.g., monitoring for, decoding, and/or receiving signals). As shown by reference number 730, based at least in part on the second SIM being associated with concurrent Rx operations, the antennas available for antenna switching on the first SIM may be limited. For example, antennas available for antenna switching on the first SIM may be limited to antenna associated with a default antenna module of the UE.

As shown in FIG. 7C, and by reference number 760, antennas available for the first SIM Tx operations during the DR-DSDS concurrency with the second SIM may be limited to antennas associated with the first antenna module (e.g., the first antenna or the second antenna). If the UE is currently configured to use the first antenna or the second antenna (e.g., based at least in part on selecting the first antenna or the second antenna by performing antenna switching as described above), then no modifications may be required for the Tx path for the first SIM during the DR-DSDS concurrency with the second SIM. However, if the UE is currently configured to use the third antenna or the fourth antenna (e.g., based at least in part on selecting the third antenna or the fourth antenna by performing antenna switching as described above), then the UE may switch the antenna for the first SIM to the first antenna or the second antenna during the DR-DSDS concurrency with the second SIM. For example, as shown by reference number 770, the second antenna module (and the third antenna or the fourth antenna) may be available for Rx operations associated with the second SIM. Therefore, the UE may be required to switch or reconfigure a Tx path for the first SIM to an antenna associated with the first antenna module (e.g., the first antenna or the second antenna) based at least in part on a limitation of antenna configuration that prohibits concurrent Tx operations and Rx operations on an antenna module (e.g., on the second antenna module), as described elsewhere herein.

Returning to FIG. 7A, as shown by reference number 740, after an expiration of the active time associated with the idle mode of the second SIM, all suitable antennas may be available for use by the first SIM for antenna switching based antenna selection (e.g., as described above in connection with reference number 710 and FIG. 7B). For example, the UE and/or the first SIM may return to a full or maximum antenna switching capability after an expiration of the active time associated with the idle mode of the second SIM. Therefore, the UE may be enabled to select a best antenna for Tx operations on the first SIM while also supporting DR-DSDS concurrency for the Rx operations on the second SIM when an antenna module of the UE is associated with a limitation that that prohibits concurrent Tx operations and Rx operations on an antenna module, as described above.

As indicated above, FIGS. 7A-7C are provided as examples. Other examples may differ from what is described with regard to FIGS. 7A-7C.

Figure 8:
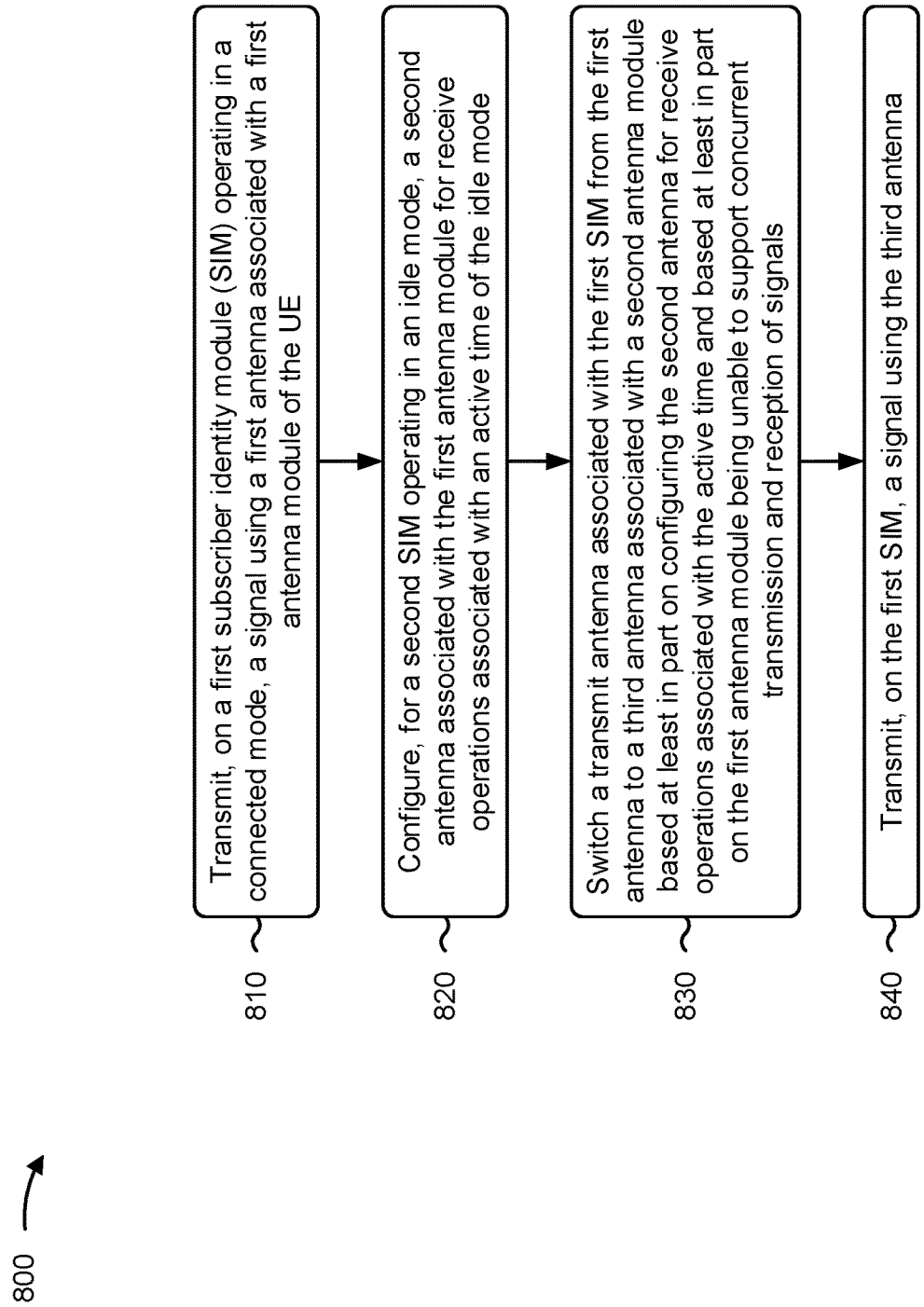
FIG. 8 is a diagram illustrating an example process associated with antenna switching for a multi-SIM UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with antenna switching for a multi-SIM UE.

As shown in FIG. 8, in some aspects, process 800 may include transmitting, on a first SIM operating in a connected mode, a signal using a first antenna associated with a first antenna module of the UE (block 810). For example, the UE (e.g., using transmission component 904, depicted in FIG. 9) may transmit, on a first SIM operating in a connected mode, a signal using a first antenna associated with a first antenna module of the UE, as described above.

As further shown in FIG. 8, in some aspects, process 800 may include configuring, for a second SIM operating in an idle mode, a second antenna associated with the first antenna module for receive operations associated with an active time of the idle mode (block 820). For example, the UE (e.g., using antenna configuration component 908, depicted in FIG. 9) may configure, for a second SIM operating in an idle mode, a second antenna associated with the first antenna module for receive operations associated with an active time of the idle mode, as described above.

As further shown in FIG. 8, in some aspects, process 800 may include switching a transmit antenna associated with the first SIM from the first antenna to a third antenna associated with a second antenna module based at least in part on configuring the second antenna for receive operations associated with the active time and based at least in part on the first antenna module being unable to support concurrent transmission and reception of signals (block 830). For example, the UE (e.g., using antenna switching component 910, depicted in FIG. 9) may switch a transmit antenna associated with the first SIM from the first antenna to a third antenna associated with a second antenna module based at least in part on configuring the second antenna for receive operations associated with the active time and based at least in part on the first antenna module being unable to support concurrent transmission and reception of signals, as described above.

As further shown in FIG. 8, in some aspects, process 800 may include transmitting, on the first SIM, a signal using the third antenna (block 840). For example, the UE (e.g., using transmission component 904, depicted in FIG. 9) may transmit, on the first SIM, a signal using the third antenna, as described above.

Process 800 may include additional aspects, such as any single aspect or any combination of aspects described below and/or in connection with one or more other processes described elsewhere herein.

In a first aspect, process 800 includes receiving (e.g., using reception component 902, depicted in FIG. 9), on the second SIM, a signal using the second antenna at a time that at least partially overlaps with a transmission time associated with transmitting the signal using the third antenna.

In a second aspect, alone or in combination with the first aspect, process 800 includes detecting (e.g., using detection component 912, depicted in FIG. 9) that a configuration of the first antenna module indicates that the first antenna module does not support concurrent transmission and reception of signals.

In a third aspect, alone or in combination with one or more of the first and second aspects, detecting that the first antenna module is associated with the configuration indicating that the first antenna module does not support concurrent transmission and reception of signals include detecting (e.g., using detection component 912, depicted in FIG. 9) that the first antenna module does not support concurrent transmission and reception of signals based at least in part on a register control setting of the first antenna module.

In a fourth aspect, alone or in combination with one or more of the first through third aspects, detecting that the first antenna module is associated with the configuration indicating that the first antenna module does not support concurrent transmission and reception of signals includes detecting (e.g., using detection component 912, depicted in FIG. 9) that the configuration of the first antenna module does not allow for the second antenna to be configured for receive operations at a same time that the first antenna is configured for transmit operation.

In a fifth aspect, alone or in combination with one or more of the first through fourth aspects, process 800 includes detecting (e.g., using detection component 912, depicted in FIG. 9) that an antenna switching procedure associated with the first SIM uses antennas associated with the first antenna module and antennas associated with the second antenna module.

In a sixth aspect, alone or in combination with one or more of the first through fifth aspects, process 800 includes refraining (e.g., using antenna switching component 910, depicted in FIG. 9) from switching the transmit antenna associated with the first SIM to an antenna associated with the first antenna module for a duration of the active time of the idle mode associated with the second SIM based at least in part on configuring the second antenna for receive operations associated with the active time of the idle mode.

In a seventh aspect, alone or in combination with one or more of the first through sixth aspects, switching the transmit antenna associated with the first SIM from the first antenna to the third antenna includes switching (e.g., using antenna switching component 910, depicted in FIG. 9) the transmit antenna associated with the first SIM from the first antenna to the third antenna for a duration of the active time of the idle mode associated with the second SIM.

In an eighth aspect, alone or in combination with one or more of the first through seventh aspects, process 800 includes switching (e.g., using antenna switching component 910, depicted in FIG. 9), after an expiration of the active time of the idle mode associated with the second SIM, the transmit antenna associated with the first SIM from the third antenna to the first antenna based at least in part on the first antenna being associated with a highest measurement parameter among antennas of the UE.

In a ninth aspect, alone or in combination with one or more of the first through eighth aspects, process 800 includes performing (e.g., using antenna switching component 910, depicted in FIG. 9) antenna switching to identify that the first antenna is associated with a highest measurement parameter among antennas of the UE, and transmitting the signal using the first antenna is based at least in part on performing antenna switching.

In a tenth aspect, alone or in combination with one or more of the first through ninth aspects, switching the transmit antenna associated with the first SIM from the first antenna to the third antenna includes switching (e.g., using antenna switching component 910, depicted in FIG. 9) the transmit antenna associated with the first SIM from the first antenna to the third antenna based at least in part on the third antenna being associated with a highest measurement parameter among antennas of the second antenna module.

In an eleventh aspect, alone or in combination with one or more of the first through tenth aspects, process 800 includes performing (e.g., using antenna switching component 910, depicted in FIG. 9), after an expiration of the active time of the idle mode associated with the second SIM, antenna switching associated with antennas of the first antenna module and the second antenna module to select the transmit antenna associated with the first SIM.

In a twelfth aspect, alone or in combination with one or more of the first through eleventh aspects, the first antenna module and the second antenna module are independently controlled antenna modules.

In a thirteenth aspect, alone or in combination with one or more of the first through twelfth aspects, transmitting the signal using the first antenna includes transmitting (e.g., using transmission component 904, depicted in FIG. 9), on the first SIM, the signal using a transmit chain that includes the first antenna module and the second antenna module.

In a fourteenth aspect, alone or in combination with one or more of the first through thirteenth aspects, the second antenna module is associated with a power amplifier that is enabled for transmit operations, and the first antenna module is not associated with a power amplifier that is enabled for transmit operations.

In a fifteenth aspect, alone or in combination with one or more of the first through fourteenth aspects, the UE is operating in a dual receive, dual SIM, dual standby mode.

In a sixteenth aspect, alone or in combination with one or more of the first through fifteenth aspects, the first SIM and the second SIM are configured to operate using a same frequency band group.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
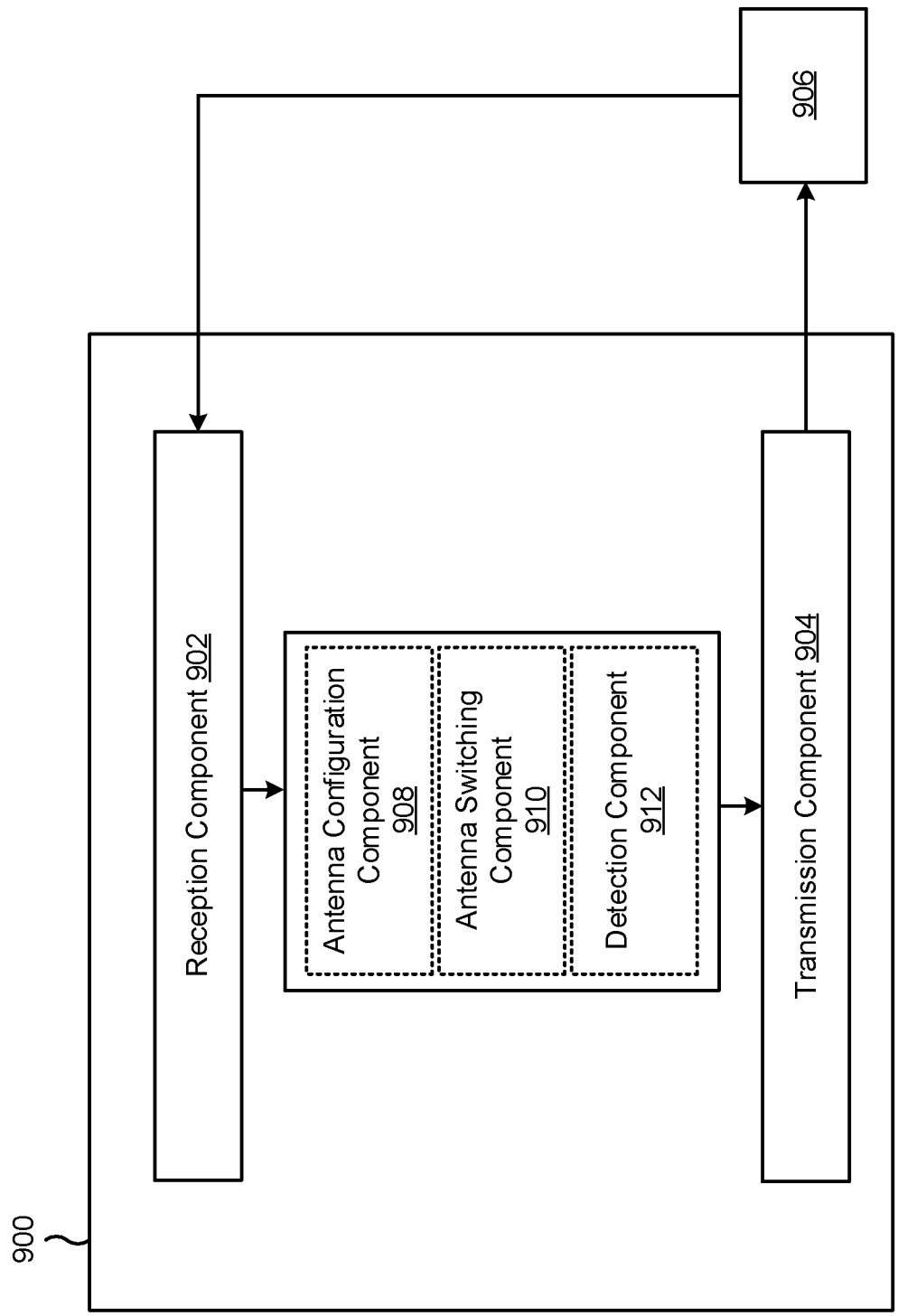
FIG. 9 is a block diagram of an example apparatus for wireless communication, in accordance with the present disclosure.

FIG. 9 is a block diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of an antenna configuration component 908, an antenna switching component 910, or a detection component 912, among other examples.

In some aspects, the apparatus 900 may be configured to perform one or more operations described herein in connection with FIGS. 6, 7A, 7B, and 7C. Additionally, or alternatively, the apparatus 900 may be configured to perform one or more processes described herein, such as process 800 of FIG. 8, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The transmission component 904 may transmit, on a first SIM operating in a connected mode, a signal using a first antenna associated with a first antenna module of the UE. The antenna configuration component 908 may configure, for a second SIM operating in an idle mode, a second antenna associated with the first antenna module for receive operations associated with an active time of the idle mode. The antenna switching component 910 may switch a transmit antenna associated with the first SIM from the first antenna to a third antenna associated with a second antenna module based at least in part on configuring the second antenna for receive operations associated with the active time and based at least in part on the first antenna module being unable to support concurrent transmission and reception of signals. The transmission component 904 may transmit, on the first SIM, a signal using the third antenna.

The reception component 902 may receive, on the second SIM, a signal using the second antenna at a time that at least partially overlaps with a transmission time associated with transmitting the signal using the third antenna.

The detection component 912 may detect that a configuration of the first antenna module indicates that the first antenna module does not support concurrent transmission and reception of signals.

The detection component 912 may detect that an antenna switching procedure associated with the first SIM uses antennas associated with the first antenna module and antennas associated with the second antenna module.

The antenna switching component 910 may refrain from switching the transmit antenna associated with the first SIM to an antenna associated with the first antenna module for a duration of the active time of the idle mode associated with the second SIM based at least in part on configuring the second antenna for receive operations associated with the active time of the idle mode.

The antenna switching component 910 may switch, after an expiration of the active time of the idle mode associated with the second SIM, the transmit antenna associated with the first SIM from the third antenna to the first antenna based at least in part on the first antenna being associated with a highest measurement parameter among antennas of the UE.

The antenna switching component 910 may perform antenna switching to identify that the first antenna is associated with a highest measurement parameter among antennas of the UE, wherein transmitting the signal using the first antenna is based at least in part on performing antenna switching.

The antenna switching component 910 may perform, after an expiration of the active time of the idle mode associated with the second SIM, antenna switching associated with antennas of the first antenna module and the second antenna module to select the transmit antenna associated with the first SIM.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting, on a first subscriber identity module (SIM) operating in a connected mode, a signal using a first antenna associated with a first antenna module of the UE; configuring, for a second SIM operating in an idle mode, a second antenna associated with the first antenna module for receive operations associated with an active time of the idle mode; switching a transmit antenna associated with the first SIM from the first antenna to a third antenna associated with a second antenna module based at least in part on configuring the second antenna for receive operations associated with the active time and based at least in part on the first antenna module being unable to support concurrent transmission and reception of signals; and transmitting, on the first SIM, a signal using the third antenna.

Aspect 2: The method of Aspect 1, further comprising: receiving, on the second SIM, a signal using the second antenna at a time that at least partially overlaps with a transmission time associated with transmitting the signal using the third antenna.

Aspect 3: The method of any of Aspects 1-2, further comprising: detecting that a configuration of the first antenna module indicates that the first antenna module does not support concurrent transmission and reception of signals.

Aspect 4: The method of Aspect 3, wherein detecting that the first antenna module is associated with the configuration indicating that the first antenna module does not support concurrent transmission and reception of signals comprises: detecting that the first antenna module does not support concurrent transmission and reception of signals based at least in part on a register control setting of the first antenna module.

Aspect 5: The method of any of Aspects 3-4, wherein detecting that the first antenna module is associated with the configuration indicating that the first antenna module does not support concurrent transmission and reception of signals comprises: detecting that the configuration of the first antenna module does not allow for the second antenna to be configured for receive operations at a same time that the first antenna is configured for transmit operation.

Aspect 6: The method of any of Aspects 1-5, further comprising: detecting that an antenna switching procedure associated with the first SIM uses antennas associated with the first antenna module and antennas associated with the second antenna module.

Aspect 7: The method of any of Aspects 1-6, further comprising: refraining from switching the transmit antenna associated with the first SIM to an antenna associated with the first antenna module for a duration of the active time of the idle mode associated with the second SIM based at least in part on configuring the second antenna for receive operations associated with the active time of the idle mode.

Aspect 8: The method of any of Aspects 1-7, wherein switching the transmit antenna associated with the first SIM from the first antenna to the third antenna comprises: switching the transmit antenna associated with the first SIM from the first antenna to the third antenna for a duration of the active time of the idle mode associated with the second SIM.

Aspect 9: The method of any of Aspects 1-8, further comprising: switching, after an expiration of the active time of the idle mode associated with the second SIM, the transmit antenna associated with the first SIM from the third antenna to the first antenna based at least in part on the first antenna being associated with a highest measurement parameter among antennas of the UE.

Aspect 10: The method of any of Aspects 1-9, further comprising: performing antenna switching to identify that the first antenna is associated with a highest measurement parameter among antennas of the UE, wherein transmitting the signal using the first antenna is based at least in part on performing antenna switching.

Aspect 11: The method of any of Aspects 1-10, wherein switching the transmit antenna associated with the first SIM from the first antenna to the third antenna comprises: switching the transmit antenna associated with the first SIM from the first antenna to the third antenna based at least in part on the third antenna being associated with a highest measurement parameter among antennas of the second antenna module.

Aspect 12: The method of any of Aspects 1-11, further comprising: performing, after an expiration of the active time of the idle mode associated with the second SIM, antenna switching associated with antennas of the first antenna module and the second antenna module to select the transmit antenna associated with the first SIM.

Aspect 13: The method of any of Aspects 1-12, wherein the first antenna module and the second antenna module are independently controlled antenna modules.

Aspect 14: The method of any of Aspects 1-13, wherein transmitting the signal using the first antenna comprises: transmitting, on the first SIM, the signal using a transmit chain that includes the first antenna module and the second antenna module.

Aspect 15: The method of any of Aspects 1-14, wherein the second antenna module is associated with a power amplifier that is enabled for transmit operations, and wherein the first antenna module is not associated with a power amplifier that is enabled for transmit operations.

Aspect 16: The method of any of Aspects 1-15, wherein the UE is operating in a dual receive, dual SIM, dual standby mode.

Aspect 17: The method of any of Aspects 1-16, wherein the first SIM and the second SIM are configured to operate using a same frequency band group.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the memory and the one or more processors configured to perform the method of one or more of Aspects 1-17

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      transmit, on a first subscriber identity module (SIM) operating in a connected mode, a signal using a first antenna associated with a first antenna module of the UE;

configure, for a second SIM operating in an idle mode, a second antenna associated with the first antenna module for receive operations associated with an active time of the idle mode;

switch a transmit antenna associated with the first SIM from the first antenna to a third antenna associated with a second antenna module based at least in part on configuring the second antenna for receive operations associated with the active time and based at least in part on the first antenna module being unable to support concurrent transmission and reception of signals; and transmit, on the first SIM, a signal using the third antenna.

2. The UE of claim 1, wherein the one or more processors are further configured to:

receive, on the second SIM, a signal using the second antenna at a time that at least partially overlaps with a transmission time associated with transmitting the signal using the third antenna.

3. The UE of claim 1, wherein the one or more processors are further configured to:

detect that a configuration of the first antenna module indicates that the first antenna module does not support concurrent transmission and reception of signals.

4. The UE of claim 1, wherein the one or more processors are further configured to:

detect that an antenna switching procedure associated with the first SIM uses antennas associated with the first antenna module and antennas associated with the second antenna module.

5. The UE of claim 1, wherein the one or more processors are further configured to:

refrain from switching the transmit antenna associated with the first SIM to an antenna associated with the first antenna module for a duration of the active time of the idle mode associated with the second SIM based at least in part on configuring the second antenna for receive operations associated with the active time of the idle mode.

6. The UE of claim 1, wherein the one or more processors, to switch the transmit antenna associated with the first SIM from the first antenna to the third antenna, are configured to:

switch the transmit antenna associated with the first SIM from the first antenna to the third antenna for a duration of the active time of the idle mode associated with the second SIM.

7. The UE of claim 1, wherein the one or more processors are further configured to:

switch, after an expiration of the active time of the idle mode associated with the second SIM, the transmit antenna associated with the first SIM from the third antenna to the first antenna based at least in part on the first antenna being associated with a highest measurement parameter among antennas of the UE.

8. The UE of claim 1, wherein the one or more processors are further configured to:

perform antenna switching to identify that the first antenna is associated with a highest measurement parameter among antennas of the UE, wherein transmitting the signal using the first antenna is based at least in part on performing antenna switching.

9. The UE of claim 1, wherein the one or more processors, to switch the transmit antenna associated with the first SIM from the first antenna to the third antenna, are configured to:

switch the transmit antenna associated with the first SIM from the first antenna to the third antenna based at least in part on the third antenna being associated with a highest measurement parameter among antennas of the second antenna module.

10. The UE of claim 1, wherein the one or more processors are further configured to:

perform, after an expiration of the active time of the idle mode associated with the second SIM, antenna switching associated with antennas of the first antenna module and the second antenna module to select the transmit antenna associated with the first SIM.

11. The UE of claim 1, wherein the one or more processors, to transmit the signal using the first antenna, are configured to:

transmit, on the first SIM, the signal using a transmit chain that includes the first antenna module and the second antenna module.

12. A method of wireless communication performed by a user equipment (UE), comprising:

transmitting, on a first subscriber identity module (SIM) operating in a connected mode, a signal using a first antenna associated with a first antenna module of the UE;

configuring, for a second SIM operating in an idle mode, a second antenna associated with the first antenna module for receive operations associated with an active time of the idle mode;

switching a transmit antenna associated with the first SIM from the first antenna to a third antenna associated with a second antenna module based at least in part on configuring the second antenna for receive operations associated with the active time and based at least in part on the first antenna module being unable to support concurrent transmission and reception of signals; and transmitting, on the first SIM, a signal using the third antenna.

13. The method of claim 12, further comprising:

receiving, on the second SIM, a signal using the second antenna at a time that at least partially overlaps with a transmission time associated with transmitting the signal using the third antenna.

14. The method of claim 12, further comprising:

detecting that a configuration of the first antenna module indicates that the first antenna module does not support concurrent transmission and reception of signals.

15. The method of claim 12, further comprising:

detecting that an antenna switching procedure associated with the first SIM uses antennas associated with the first antenna module and antennas associated with the second antenna module.

16. The method of claim 12, further comprising:

refraining from switching the transmit antenna associated with the first SIM to an antenna associated with the first antenna module for a duration of the active time of the idle mode associated with the second SIM based at least in part on configuring the second antenna for receive operations associated with the active time of the idle mode.

17. The method of claim 12, wherein switching the transmit antenna associated with the first SIM from the first antenna to the third antenna comprises:

switching the transmit antenna associated with the first SIM from the first antenna to the third antenna for a duration of the active time of the idle mode associated with the second SIM.

18. The method of claim 12, further comprising:

switching, after an expiration of the active time of the idle mode associated with the second SIM, the transmit antenna associated with the first SIM from the third antenna to the first antenna based at least in part on the first antenna being associated with a highest measurement parameter among antennas of the UE.

19. The method of claim 12, further comprising:
performing antenna switching to identify that the first antenna is associated with a highest measurement parameter among antennas of the UE, wherein transmitting the signal using the first antenna is based at least in part on performing antenna switching.

20. The method of claim 12, wherein switching the transmit antenna associated with the first SIM from the first antenna to the third antenna comprises:
switching the transmit antenna associated with the first SIM from the first antenna to the third antenna based at least in part on the third antenna being associated with a highest measurement parameter among antennas of the second antenna module.

21. The method of claim 12, further comprising:
performing, after an expiration of the active time of the idle mode associated with the second SIM, antenna switching associated with antennas of the first antenna module and the second antenna module to select the transmit antenna associated with the first SIM.

22. The method of claim 12, wherein transmitting the signal using the first antenna comprises:
transmitting, on the first SIM, the signal using a transmit chain that includes the first antenna module and the second antenna module.

23. A non-transitory computer-readable medium storing a set of instructions for wireless communication, the set of instructions comprising:
one or more instructions that, when executed by one or more processors of a user equipment (UE), cause the UE to:
transmit, on a first subscriber identity module (SIM) operating in a connected mode, a signal using a first antenna associated with a first antenna module of the UE;
configure, for a second SIM operating in an idle mode, a second antenna associated with the first antenna module for receive operations associated with an active time of the idle mode;
switch a transmit antenna associated with the first SIM from the first antenna to a third antenna associated with a second antenna module based at least in part on configuring the second antenna for receive operations associated with the active time and based at least in part on the first antenna module being unable to support concurrent transmission and reception of signals; and
transmit, on the first SIM, a signal using the third antenna.

24. The non-transitory computer-readable medium of claim 23, wherein the one or more instructions further cause the UE to:
receive, on the second SIM, a signal using the second antenna at a time that at least partially overlaps with a transmission time associated with transmitting the signal using the third antenna.

25. The non-transitory computer-readable medium of claim 23, wherein the one or more instructions, that cause the UE to switch the transmit antenna associated with the first SIM from the first antenna to the third antenna, cause the UE to:
switch the transmit antenna associated with the first SIM from the first antenna to the third antenna for a duration of the active time of the idle mode associated with the second SIM.

26. The non-transitory computer-readable medium of claim 23, wherein the one or more instructions further cause the UE to:
switch, after an expiration of the active time of the idle mode associated with the second SIM, the transmit antenna associated with the first SIM from the third antenna to the first antenna based at least in part on the first antenna being associated with a highest measurement parameter among antennas of the UE.

27. An apparatus for wireless communication, comprising:
means for transmitting, on a first subscriber identity module (SIM) operating in a connected mode, a signal using a first antenna associated with a first antenna module of the apparatus;
means for configuring, for a second SIM operating in an idle mode, a second antenna associated with the first antenna module for receive operations associated with an active time of the idle mode;
means for switching a transmit antenna associated with the first SIM from the first antenna to a third antenna associated with a second antenna module based at least in part on configuring the second antenna for receive operations associated with the active time and based at least in part on the first antenna module being unable to support concurrent transmission and reception of signals; and
means for transmitting, on the first SIM, a signal using the third antenna.

28. The apparatus of claim 27, further comprising:
means for receiving, on the second SIM, a signal using the second antenna at a time that at least partially overlaps with a transmission time associated with transmitting the signal using the third antenna.

29. The apparatus of claim 27, wherein the means for switching the transmit antenna associated with the first SIM from the first antenna to the third antenna comprises:
means for switching the transmit antenna associated with the first SIM from the first antenna to the third antenna for a duration of the active time of the idle mode associated with the second SIM.

30. The apparatus of claim 27, further comprising:
means for switching, after an expiration of the active time of the idle mode associated with the second SIM, the transmit antenna associated with the first SIM from the third antenna to the first antenna based at least in part on the first antenna being associated with a highest measurement parameter among antennas of the apparatus.

* * * * *